United States Patent
Mana et al.

(10) Patent No.: US 12,339,857 B2
(45) Date of Patent: Jun. 24, 2025

(54) METHODS FOR METADATA DRIVEN APPLICATION PROGRAMMING INTERFACE CREATION

(71) Applicant: JPMORGAN CHASE BANK, N.A., New York, NY (US)

(72) Inventors: Chandrasekharan N Mana, Hoffman Estates, IL (US); Gaurav Gupta, Bangalore (IN); Vinod Sharma, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 31 days.

(21) Appl. No.: 18/366,280

(22) Filed: Aug. 7, 2023

(65) Prior Publication Data

US 2024/0419671 A1 Dec. 19, 2024

(30) Foreign Application Priority Data

Jun. 16, 2023 (IN) .............................. 202311041092

(51) Int. Cl.
  *G06F 16/2457* (2019.01)
  *G06F 16/23* (2019.01)
(52) U.S. Cl.
  CPC .... *G06F 16/24573* (2019.01); *G06F 16/2358* (2019.01)
(58) Field of Classification Search
  CPC .................. G06F 16/24573; G06F 16/2358
  See application file for complete search history.

(56) References Cited

U.S. PATENT DOCUMENTS

| | | | |
|---|---|---|---|
| 10,795,901 B2* | 10/2020 | Tolani | G06F 16/215 |
| 11,386,107 B1* | 7/2022 | Walker | G06F 16/211 |
| 12,229,156 B2* | 2/2025 | Park | G06F 16/9024 |
| 2016/0077901 A1* | 3/2016 | Roth | G06F 8/315 |
| | | | 719/328 |
| 2016/0125070 A1* | 5/2016 | Snell | G06F 16/289 |
| | | | 707/722 |
| 2019/0340518 A1* | 11/2019 | Merrill | G06F 40/56 |

* cited by examiner

*Primary Examiner* — Angelica Ruiz
(74) *Attorney, Agent, or Firm* — GREENBERG TRAURIG LLP

(57) ABSTRACT

Methods for a metadata driven application programming interface (API) creation service are disclosed. In one embodiment, a computer-implemented method may include: (1) generating, by an API service application program, a query including request data received in an API request, (2) determining, by the API service application program and based on the request data, a target database associated with the API request, (3) executing, by the API service application, the query on the target database to retrieve a result including a target dataset, the target dataset including target metadata, (4) mapping, by the API service application program, the target metadata to format data compatible with program code for building an API responsive to the API request, and (5) creating, by the API service application program and utilizing the program code, the API based on the formatted target metadata.

17 Claims, 6 Drawing Sheets

500

| Column Name | Field Name | Data Type | Searchable? |
|---|---|---|---|
| NAICS_Code | naicsCode | Timestamp | Y |
| Verson_DT | industryUpdateDate | VarChar | Y |
| NAICS_Status | naicsStatus | VarChar | N |

FIGURE 5

METHODS FOR METADATA DRIVEN APPLICATION PROGRAMMING INTERFACE CREATION

RELATED APPLICATIONS

This application claims the benefit of Indian patent application No. 202311041092, filed Jun. 16, 2023. The disclosure of this application is hereby incorporated, by reference, in its entirety.

BACKGROUND OF THE INVENTION

1. Field of the Invention

Embodiments generally relate to methods for a metadata driven application programming interface (API) service for creating new APIs without changing code.

2. Description of the Related Art

Application programming interfaces (APIs) are widely used service by for distributing data between two or software applications running on consumer and/or enterprise networked computing devices. For example, a financial services enterprise cloud computing network may utilize APIs for communicating bulk customer financial data from data collection application software to a loan origination software application for processing operations.

The utilization of APIs, however, may often suffer from a number of drawbacks when updates (i.e., to make code changes) need to be made in an application execution environments such as development, quality assurance, and production. In particular, traditional approaches for updating APIs requires restarting applications causing service interruptions and resulting in undesired downtime.

SUMMARY OF THE INVENTION

Methods for utilizing a metadata driven API creation service are disclosed. In one embodiment, a method may include: (1) generating, by an API service application executing on one or more computing devices, a query including request data received in an API request; (2) determining, by the API service application program and based on the request data, a database associated with the API request; (3) executing, by the API service application program, the query on the database to retrieve a result, including the metadata; (4) mapping, by the API service application program, the metadata to format data compatible with program code for building an API responsive to the API request; and (5) creating, by the API service application program and utilizing the program code, the API based on the formatted metadata. Additionally, the API service application program may receive updated request data for the API and modify the API based on the updated request data.

In one embodiment, the query received in the API request may be generated by validating request parameter data and preparing filter criteria for the query utilizing the request parameter data.

In one embodiment, the database may be determined by analyzing service name data in the request data to identify a metadata service associated with the database.

In one embodiment, the metadata may be mapped to the format data compatible with the program code by accessing metadata reference data from the query result to locate the metadata in a cache and mapping field data from the metadata to field data associated with the program code. The format data include JavaScript Object Notation (JSON) or comma-separated values (CSV) format data.

In one embodiment, the request data may include user role data relied upon for authorization for calling the API. In one embodiment, the API service application may be a microservice. In one embodiment, the databases may include, without limitation, an Apache Impala-based database service, an oracle-based database, and/or a common basic data set (CBDS) database.

BRIEF DESCRIPTION OF THE DRAWINGS

For a more complete understanding of the present invention, the objects and advantages thereof, reference is now made to the following descriptions taken in connection with the accompanying drawings in which:

FIG. 5 illustrates a metadata mapping table that may be generated by a metadata driven API creation service according to an embodiment; according to an embodiment.

DETAILED DESCRIPTION OF PREFERRED EMBODIMENTS

Embodiments may provide methods for building a metadata driven framework that enables the building of APIs out of a metadata configuration. In some examples, the framework described herein may include a query build processor that receives a validated user request including request data for building an API. The framework may also include a query builder that builds and executes a query on a database selected based on the request. For example, the request data may include a service name for a metadata service that may be utilized to find an associated database entry for retrieving the metadata needed to build the requested API. The query build processor may also utilize request parameter data (e.g., received from the request data) to prepare filter criteria for a metadata query, metadata reference data that may be utilized to find metadata from a cached object (e.g., a metadata cache), and user role data that may contain user authorization for an API call upon the API being built. The query builder may build and execute the query to the selected database for retrieving the data. Additionally the framework may include column mapping of fields in the retrieved metadata to a compatible format for a serializer (e.g., a JSON or CSV serializer) that may build the API and send it in a response stream to requesting users.

Embodiments described herein may enable database (e.g., structured query language (SQL)) entries to be converted into APIs (e.g., representational state transfer (REST) APIs). Embodiments described herein may further enable the building of complete JAVA object APIs (e.g., JAVA POJO APIs) utilizing metadata allowing for flexible parameters. Embodiments described herein may additionally support multiple output formats (e.g., JSON (as a default output format)

and/or CSV). Embodiments described herein may further support connectivity for multiple data source types and enable the changing of these data sources based on metadata. Embodiments described herein may additionally provide for the authentication and authorization of API call requests. Embodiments described herein may further allow for data source connections to be configured in metadata and the changing of these data source connections in running environments such as development, quality assurance, and production environments. Embodiments described herein may additionally provide for the updating of metadata without restarting applications to allow for uninterrupted API service, thereby eliminating change downtime and reducing overall API development costs.

Figure 1:
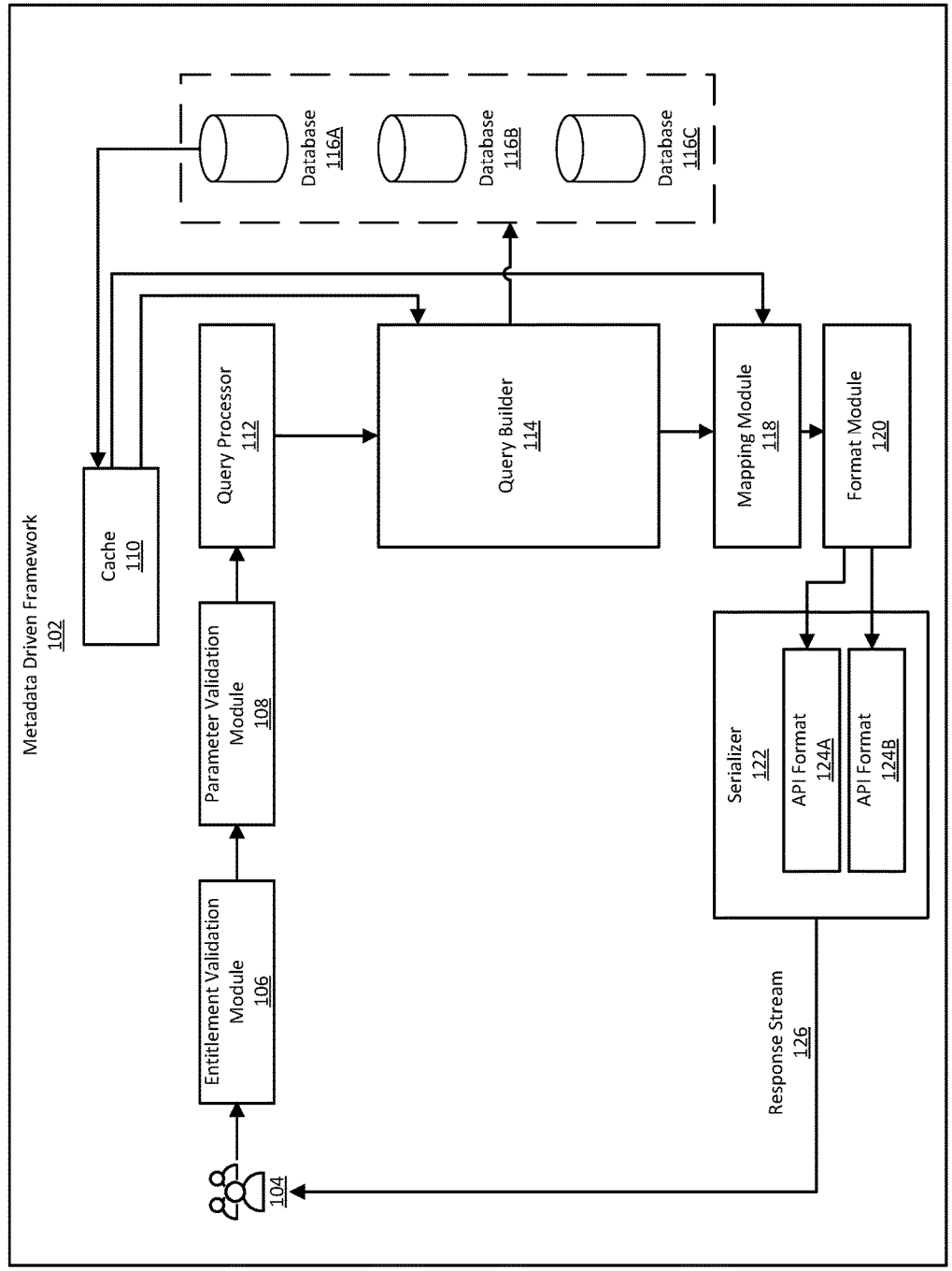
FIG. 1 depicts a system for a metadata driven API service according to an embodiment.

Referring to FIG. 1, a system 100 for a metadata driven application programming interface (API) creation service. System 100 may include a metadata driven framework 102. Metadata driven framework 102 may include a set of users 104 for making an API call request. In various embodiments, users 104 may send a request, including parameters utilized for requesting metadata utilized for creating the called API, to entitlement validation module 106 and parameter validation module 108, respectively. Each of entitlement validation module 106 and parameter validation module 108 may verify users 104 and the parameters, respectively. Upon successful validation, query processor 112 may receive the parameters and forward them to query builder 114.

As will be described in greater detail below, query builder 114 may be configured to create a database query, utilizing the parameters as filtering criteria, and execute the query on databases 116A, 116B, and/or 116C. A query built in query builder 114 is sent to a database (e.g., databases 116A, 116B, and/or 116C) for fetching a result. Mapping module 118 may retrieve metadata column mapping from cache 110 and map database columns to display field names for users 104. Format module 120 may determine an API format (e.g. API format 124A or 124B) to be utilized by serializer 122 for converting the metadata into an API for sending in response stream 126 to users 104.

Figure 2:
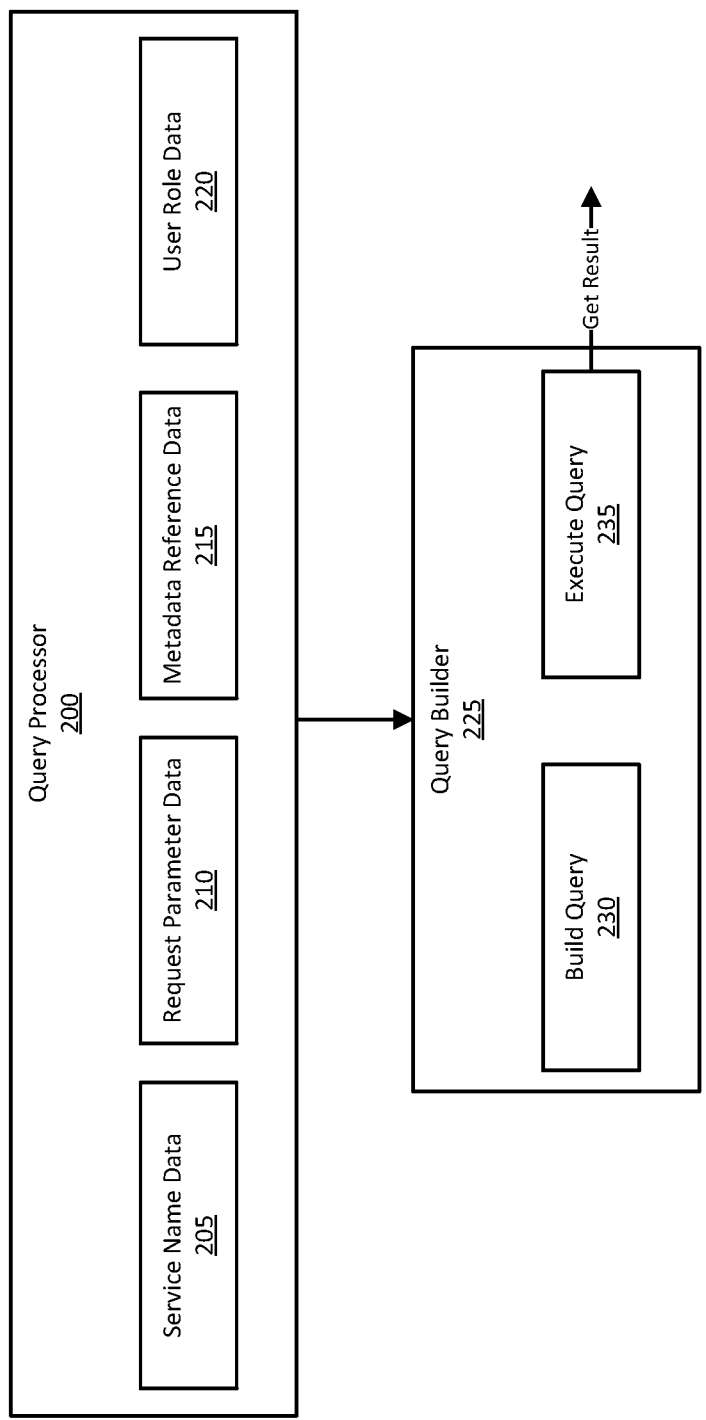
FIG. 2 illustrates a query processor and a query builder that may be utilized for a metadata driven API creation service according to an embodiment.

FIG. 2 illustrates a query processor 200 and a query builder 225 that may be utilized for a metadata driven API creation service according to an embodiment. In embodiments, query processor 200 may include input data (which may be received from a requesting user) utilized by query builder 225 for building a metadata query. The input data may include service name data 205, request parameter data 210, metadata reference data 215 and user role data 220. Service name data 205 may identify a database service (e.g., commercial real estate loan processing) to be utilized for the metadata query. In some examples, query builder 225 may be configured to utilize service name data 205 to identify a corresponding database (e.g., database connection information) such as, for example and without limitation, a common basic data set (CBDS) database, an Oracle database, or an Apache Impala-based database. Request parameter data 210 may represent data utilized to prepare filter criteria for query builder 225. Metadata reference data 215 may represent data utilized to find metadata from a cached object (e.g., a metadata cache) associated with a database. User role data 220 may represent a user authorization for calling the API that will be generated in response to the query built by query builder 225.

Query builder 225 may include a build query 230 module and an execute query 235 module. Build query 230 module may be utilized to build a query to a database and execute query 235 module may be utilized to execute the database query (e.g., including a "Get Result" command).

Figure 3:
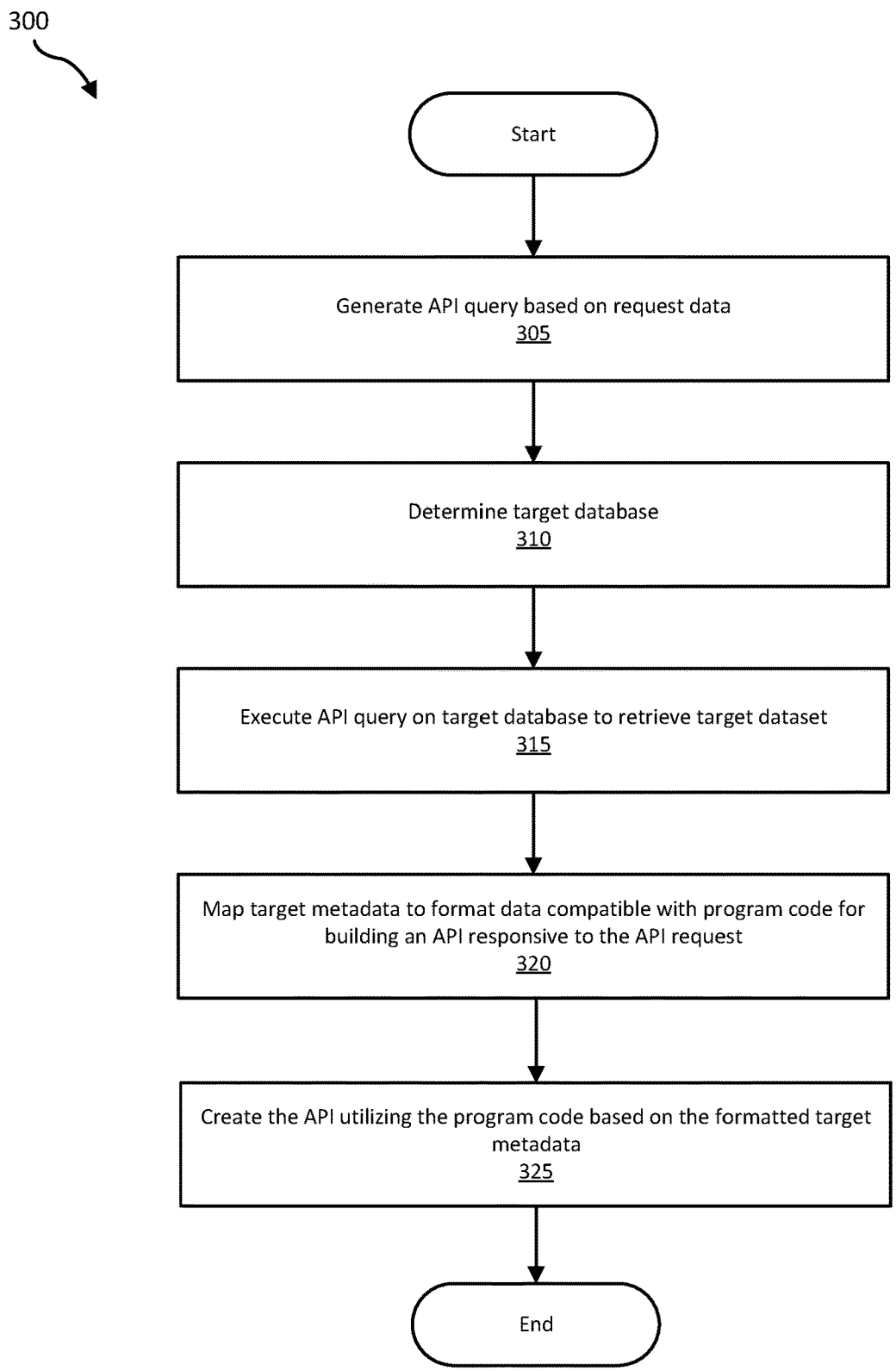
FIG. 3 depicts a method for utilizing a metadata driven API creation service according to an embodiment.

Referring to FIG. 3, a method 300 for utilizing a metadata driven API creation service is disclosed according to one embodiment.

In step 305, an API service application program may generate an API query based on request data. For example, the API service application program may receive request data in an API request and validate request parameter data in the request data. Additionally, the API service application program may prepare filter criteria for the query utilizing the request parameter data. In one embodiment, the API service application program may be a microservice operating in a cloud-based microservice architecture environment. In one embodiment, the request data may include user role data. The user role data may include authorization for calling an API by a requesting user.

In step 310, the API service application program may determine a target database. For example, the API service application program may analyze service name data in the request data to identify an associated database (e.g., a CBDS database, an Oracle database, or an Apache Impala-based database.

In step 315, the API service application program may execute the API query generated at step 310 on the target database to retrieve a target dataset including target metadata. For example, the API service application program may send an API query to a CBDS database for retrieving a query result.

In step 320, the API service application program may map the target metadata to format data compatible with program code for building an API responsive to the API request. In one embodiment, the API service application program may map the target metadata by accessing metadata reference data from the query result to locate the target metadata and then map field data from the target metadata to field data associated with the program code. In some embodiments, the format data compatible with the program code may include JavaScript Object Notation (JSON) format data. In other embodiments, the format data may include comma-separated values (CSV) format data.

In step 325, the API service application program may create the API (based on the API query) utilizing the program code based on the formatted target metadata. For example, the API service application program may utilize JSON or CSV formatted metadata to create an API Response for sending to one or more users In some embodiments, following the creation and sending of the API, the API service application program may receive updated request data (e.g., for modifying the previously sent API) and then modify the API based on the updated request data by performing steps 305 through 325, described above.

Figure 4:
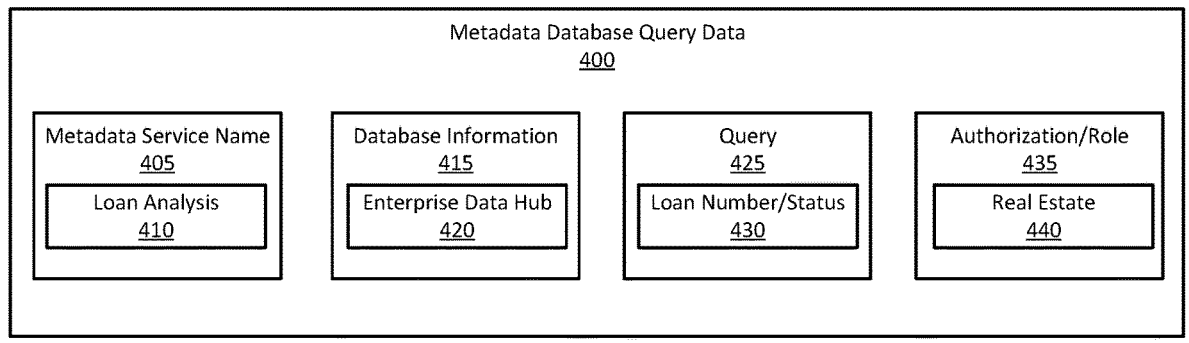
FIG. 4 illustrates database query data that may be utilized by a metadata driven API creation service according to an embodiment according to an embodiment.

FIG. 4 illustrates database query data 400 that may be utilized by a metadata driven API creation service according to an embodiment. In one example, database query data 400 may include a metadata service name 405, database information 415, query 425, and an authentication/role 435.

In one embodiment, metadata service name 405 may identify a metadata service (such as loan analysis 410) for which metadata is stored as database information 415 in an "enterprise database hub" 420 database. In one embodiment, query 425 may include a request for loan number/status 430 data associated with an authorization/role 435 for a real estate user (e.g., a commercial real estate loan processor) authorized to receive the results of query 425.

FIG. 5 illustrates a metadata mapping table 500 that may be generated by a metadata driven API creation service according to an embodiment. In one example, metadata mapping table 500 may include a metadata column name column, a field name column, a data type column, and a "searchable?" column. The metadata column name column may contain metadata service code, service code version, and service code status names that are mapped into field names compatible with a name format displayed for users requesting an associated API, a column indicating whether or not a fieldname is searchable, and a column data type (e.g., a timestamp or variable character (VarChar) datatype).

Figure 6:
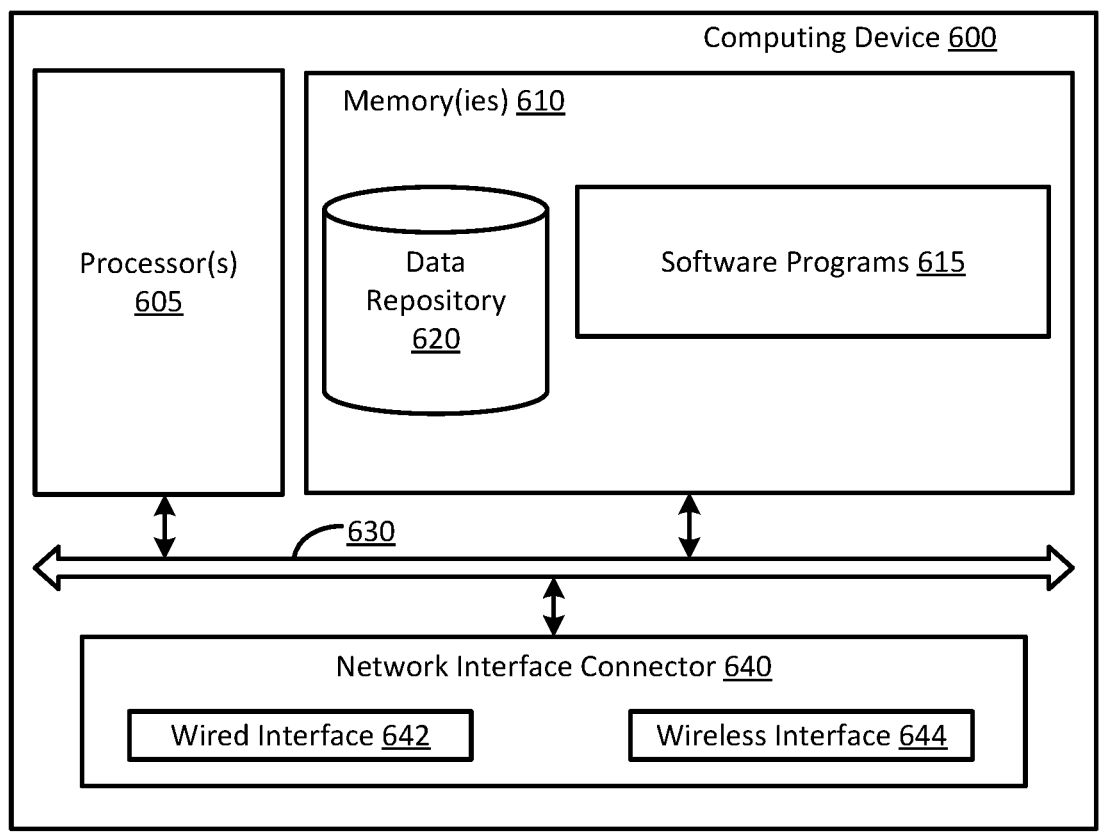
FIG. 6 depicts an exemplary computing system for implementing aspects of the present disclosure.

FIG. 6 depicts an exemplary computing system for implementing aspects of the present disclosure. FIG. 6 depicts exemplary computing device 600. Computing device 600 may represent the system components described herein. Computing device 600 may include processor 605 that may be coupled to memory 610. Memory 610 may include volatile memory. Processor 605 may execute computer-executable program code stored in memory 610, such as software programs 615. Software programs 615 may include one or more of the logical steps disclosed herein as a programmatic instruction, which may be executed by processor 605. Memory 610 may also include data repository 620, which may be nonvolatile memory for data persistence. Processor 605 and memory 610 may be coupled by bus 630. Bus 630 may also be coupled to one or more network interface connectors 640, such as wired network interface 642 or wireless network interface 644. Computing device 600 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the methods of embodiments will be described.

Embodiments of a system or portions of the system for performing the methods described herein may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for a metadata driven application programming interface (API) creation service, at least a portion of the method being performed by one or more computing devices comprising at least one processor, the method comprising:
    generating, by an application programming interface (API) service application program executing on the one or more computing devices, a query comprising request data received in an API request comprising preparing filter criteria for the query utilizing request parameter data in the request data, wherein the API service application program is a microservice operating in a cloud-based microservice architecture environment;
    determining, by the API service application program and based on the request data, a target database associated with the API request;
    executing, by the API service application program, the query on the target database to retrieve a result comprising a target dataset including target metadata;
    mapping, by the API service application program, the target metadata to format data compatible with program code for building an API responsive to the API request;
    receiving, by the API service application program, updated request data for the API;

modifying, by the API service application program, the API based on the updated request data; and creating, by the API service application program and utilizing the program code, the API based on the formatted target metadata.

2. The computer-implemented method of claim 1, wherein generating the query comprising the request data received in the API request comprises validating request parameter data in the request data.

3. The computer-implemented method of claim 1, wherein determining, based on the request data, the target database associated with the API request comprises analyzing service name data in the request data to identify a metadata service associated with the target database.

4. The computer-implemented method of claim 1, wherein mapping the target metadata to the format data compatible with the program code for building the API responsive to the API request comprises:

accessing metadata reference data from the query result to locate the target metadata; and mapping field data from the target metadata to field data associated with the program code.

5. The computer-implemented method of claim 1, wherein the format data compatible with the program code comprises JavaScript Object Notation (JSON) format data.

6. The computer-implemented method of claim 1, wherein the format data compatible with the program code comprises comma-separated values (CSV) format data.

7. The computer-implemented method of claim 1, wherein the target metadata comprises data from one or more of a plurality of databases.

8. The computer-implemented method of claim 7, wherein each of the plurality of databases is associated with a data management data store.

9. The computer-implemented method of claim 8, wherein the data management data store comprises at least one of:

a common basic data set database;

an Oracle database; or an Apache Impala-based database.

10. The computer-implemented method of claim 1, wherein the request data comprises user role data including authorization for calling the API.

11. A computer-implemented method for a metadata driven application programming interface (API) creation service, at least a portion of the method being performed by one or more computing devices comprising at least one processor, the method comprising:

generating, by an application programming interface (API) service application program executing on the one or more computing devices, a query comprising request data received in an API request comprising preparing filter criteria for the query utilizing request parameter data in the request data, wherein the API service application program is a microservice operating in a cloud-based microservice architecture environment;

determining, by the API service application program and based on the request data, a target database associated with the API request;

executing, by the API service application program, the query on the target database to retrieve a result comprising a target dataset including target metadata;

mapping, by the API service application program, the target metadata to format data compatible with program code for building an API responsive to the API request;

creating, by the API service application program and utilizing the program code, the API based on the formatted target metadata;

receiving, by the API service application program, updated request data for the API; and modifying, by the API service application program, the API based on the updated request data.

12. The computer-implemented method of claim 11, wherein generating the query comprising the request data received in the API request comprises validating request parameter data in the request data.

13. The computer-implemented method of claim 11, wherein determining, based on the request data, the target database associated with the API request comprises analyzing service name data in the request data to identify a metadata service associated with the target database.

14. The computer-implemented method of claim 11, wherein mapping the target metadata to the format data compatible with the program code for building the API responsive to the API request comprises:

accessing metadata reference data from the query result to locate the target metadata; and mapping field data from the target metadata to field data associated with the program code.

15. The computer-implemented method of claim 11, wherein the format data compatible with the program code comprises JavaScript Object Notation (JSON) format data.

16. The computer-implemented method of claim 11, wherein the format data compatible with the program code comprises comma-separated values (CSV) format data.

17. A computer-implemented method for a metadata driven application programming interface (API) creation service, at least a portion of the method being performed by one or more computing devices comprising at least one processor, the method comprising:

generating, by an application programming interface (API) microservice application program executing on the one or more computing devices, a query comprising request data received in an API request comprising preparing filter criteria for the query utilizing request parameter data in the request data, wherein the API service application program is a microservice operating in a cloud-based microservice architecture environment;

determining, by the API microservice application program and based on the request data, a target database associated with the API request;

executing, by the API microservice application program, the query on the target database to retrieve a result comprising a target dataset including target metadata;

mapping, by the API microservice application program, the target metadata to format data compatible with program code for building an API responsive to the API request;

creating, by the API microservice application program and utilizing the program code, the API based on the formatted target metadata; and modifying, by the API microservice application program, the API based on updated request data.

* * * * *